3,149,037
VITAMIN COMPOSITIONS
Ronald Eugene Aiello, Belleville, and Jacob Christopher Bauernfeind, Glen Rock, N.J., assignors to Hoffmann-La Roche Inc., Nutley, N.J., a corporation of New Jersey
No Drawing. Filed Sept. 7, 1962, Ser. No. 222,170
12 Claims. (Cl. 167—81)

This invention relates, in general, to novel vitamin compositions. More particularly, it relates to vitamin solutions which are especially well suited for administration by injection.

The necessity for supplementing the diet of poultry and animals with vitamins is well known. In recent years, vitamin fortification of the food and feed of poultry and animals has been accomplished, primarily, by incorporating therein stable, dry, vitamin-containing beadlets. However, it has long been recognized that beef cattle and dairy cattle, as well as sheep, horses, etc., require amounts of vitamins in excess of those customarily supplied in their daily feed ration. A definite need has been known to exist for stable, but yet fully biologically available, vitamin compositions which could be administered by injection to provide these additional requirements.

Thus, in its most comprehensive embodiment, the present invention is concerned with novel vitamin compositions.

In a more specific embodiment, the invention is concerned with the provision of high potency vitamin solutions which are particularly adapted for administration by injection.

In another embodiment, the invention is concerned with providing vitamin solutions which form emulsions when mixed with water.

The novel vitamin compositions of this invention are clear emulsifiable solutions of certain fat-soluble vitamins. Liquid glycerines, more particularly, glyceryl triesters of lower molecular weight fatty acids, are present as the solvent phase of these solutions. Additionally, the compositions of this invention contain benzyl alcohol and they contain also, as emulsifying agents, polyoxyethylene sorbitan esters, and polyethylene glycol esters, of fatty acids having from 16 to 18 carbon atoms in their chain. In certain instances, the compositions of the invention contain also suitable edible antioxidants.

The present compositions contain fat-soluble vitamins, such as vitamin A, vitamin D, vitamin E, and mixtures thereof. In the practice of this invention, vitamin A alcohol is employed as the vitamin A component. As the vitamin D component, vitamin $D_2$ (calciferol) and vitamin $D_3$ (7-dehydrocholesterol) are preferably employed. As the vitamin E component, α-tocopherol is preferably employed.

The compositions of this invention are characterized in that a fat-soluble vitamin, or a mixture of fat-soluble vitamins, is dissolved in a liquid glyceryl triester of a lower molecular weight fatty acid. More specifically, the vitamin, or the vitamin mixture, is dissolved in a liquid glyceryl triester either of a saturated fatty acid, or of a mixture of saturated fatty acids, having a carbon chain length of from 6 to 12 carbon atoms. Thus, for example, as the solvent for the vitamin component of the product one may use a glyceryl triester of caproic acid, caprylic acid, capric acid or lauric acid. Additionally, one may use a glyceryl ester prepared from a mixture of such acids. Moreover, if desired, a combination of such glyceryl triesters can be employed as the solvent for the vitamin component of the product. In producing the preferred compositions of the invention, however, glyceryl triesters of mixtures of $C_6$ to $C_{12}$ fatty acids are employed. For convenience, the liquid glyceryl triesters which are used in the practice of this invention will be referred to at times hereinafter merely as "liquid triglycerides." In connection with these liquid triglycerides, it should be noted that, while they may contain residues of $C_{14}$ and higher fatty acids, generally, they will not contain more than about 40% by weight of such higher fatty acid. Under ordinary circumstances, the presence of up to about 40% by weight of residues of $C_{14}$ and higher fatty acids in the esters will not deleteriously affect either the products or the properties thereof. However, the preferred products of the invention are formulated using liquid triglycerides which contain not more than about 10% of $C_{14}$ and higher fatty acids.

As indicated heretofore, the compositions of this invention contain benzyl alcohol and emulsifying agents as components thereof. Additionally, certain products of the invention contain edible antioxidants, such as butylated hydroxyanisole, butylated hydroxytoluene or mixtures thereof. An edible antioxidant must be used in the case of a product containing either vitamin A or a mixture of vitamin A and vitamin D. An antioxidant need not be used, however, in formulating those compositions of the invention which contain vitamin E as the sole vitamin component. However, an antioxidant can be used, if desired, in producing vitamin E compositions. The products of this invention which contain either vitamin A or a mixture of vitamin A and vitamin D either alone or in admixture with vitamin E, preferably contain a mixture of butylated hydroxyanisole and butylated hydroxytoluene as the antioxidant.

In carrying out the present invention, one may use a polyoxyethylene sorbitan ester of a fatty acid having from 16 to 18 carbon atoms as the emulsifying agent. In the alternative, one may use a polyethylene glycol ester of a fatty acid having from 16 to 18 carbon atoms. Thus, for example, a polyoxyethylene sorbitan ester of palmitic acid, stearic acid, oleic acid or ricinoleic acid can be employed, if desired. Additionally, a polyethylene glycol ester, such as polyethylene glycol 400 ricinoleate, polyethylene glycol 600 monooleate, etc., can be used. In producing the preferred products of the invention, however, polyoxyethylene sorbitan monooleate is used as the emulsifying agent.

The quantities of the ingredients used in formulating the novel vitamin compositions of this invention may be varied within rather wide limits. The vitamin component, or the mixture of vitamins, can comprise up to about 70% of the weight of the non-aqueous final product. It may, however, comprise as little as about 4.0% by weight of the product. The liquid triglyceride comprises from about 20% to about 90% of the weight of the final product.

Variations in the quantity of emulsifying agent used are also possible. For example, polyoxyethylene sorbitan fatty acid esters and polyethylene glycol fatty acid esters will comprise at least about 0.5% of the weight of the final product. It may, however, comprise up to about 20.0% of the weight of the product. Larger quantities of the emulsifying agents can be employed, if desired. However, the presence of more than about 20.0% by weight of emulsifier in the final product is generally unnecessary and impractical. The preferred vitamin compositions of the invention, however, contain about 1.0% to 10.0% by weight of polyoxyethylene sorbitan monooleate.

Varying quantities of benzyl alcohol can be employed in formulating the present products. Generally, however, the compositions will contain from about 1.0% to about 10.0% by weight of benzyl alcohol. However, ordinarily benzyl alcohol will comprise about 2.0% of the weight of the preferred compositions of this invention.

Additionally, certain variations are possible in the quantities of antioxidants used. In the case of a product containing vitamin E as the sole vitamin component, the presence of an antioxidant is optional. However, in the case of a product containing either the vitamin A or vitamin D, an antioxidant must be present therein. Generally, the antioxidant will comprise from about 0.1% to about 2.0% of the weight of the final product. While a larger quantity of antioxidant may be used in the practice of this invention, under ordinary circumstances the use of such larger quantity is neither necessary nor practical. Preferably, the products of this invention will contain from about 0.15% to about 1.5% by weight of antioxidant. Furthermore, while either butylated hydroxyanisole or butylated hydroxytoluene can be employed as the antioxidant, a mixture thereof is used in preparing the preferred products of the invention.

The present compositions are characterized, in part at least, by the fact that they may possess a relatively high vitamin potency. It will be appreciated, however, that the invention is not necessarily limited to high potency products. For example, the present compositions can contain from about 100,000 to about 2,000,000 I.U. of vitamin A per ml. A preferred class of products, however, contain about 500,000 I.U. of vitamin A per ml. Similar variations in vitamin potency are possible in the case of products containing vitamin D or vitamin E, or mixtures thereof with vitamin A alcohol. As a general rule, however, where vitamin D or vitamin E, or a mixture thereof, is used in conjunction with vitamin A alcohol, the vitamin D and/or the vitamin E potency of the product will be determined by the vitamin A potency of the product. Under ordinary circumstances, such products will be provided with one unit of vitamin D for each 10 units of vitamin A present therein. Thus, for example, in the case of a product containing 200,000 I.U. per ml. of vitamin A, such product preferably will contain also about 20,000 I.U. per ml. of vitamin D. Similarly, in the case of a product containing 1,000,000 I.U. per ml. of vitamin A, such product will contain preferably about 100,000 I.U. per ml. of vitamin D. A preferred composition of the invention contains, for example, 500,000 I.U. per ml. of vitamin A in admixture with 50,000 I.U. per ml. of vitamin D.

Where vitamin E is used in formulating the compositions of the present invention either in admixture with vitamin A alone or in admixture with both vitamin A and vitamin D, the vitamin E potency of such product will vary preferably within the range of from about 25 I.U. per ml. to about 600 I.U. per ml. Where, however, vitamin E is employed as the sole vitamin component of the composition, a sufficient quantity of vitamin E will be used to provide a product having a potency up to about 600 I.U. per ml. These variations in the vitamin potencies of the various products included within the scope of this invention will be demonstrated in the examples which follow hereinafter.

While the quantity of vitamin component used in producing the novel products of this invention may vary, ordinarily such component will comprise from about 4% to about 70% of the weight of the final product. However, the precise quantity of vitamin component which is to be used in any particular instance will be determined by the vitamin potency of the component itself and by the potency desired in the final product. Hence, although under ordinary circumstances, the compositions of this invention will contain not more than about 70% by weight of the final component, it will be understood that the precise quantity of vitamin or vitamin mixture used in any particular embodiment of the invention will be subject to certain variations.

The compositions of the present invention can be prepared quite readily. In a preferred embodiment of the invention, however, the compositions are prepared in the following manner. In an initial step of the process the edible antioxidant, or the antioxidant mixture, is added to, and mixed with, benzyl alcohol until complete dissolution of the antioxidant in the alcohol has taken place. This step of the procedure can be carried out, if desired, at room temperature. However, it has been found that formation of the desired solution is expedited when benzyl alcohol is heated to a temperature of about 50° C. prior to adding the antioxidant or antioxidant mixture thereto. The solution which is thus obtained, together with the emulsifying agent, for example, polyoxyethylene sorbitan monooleate, is added to, and stirred with, the vitamin component. Subsequently, the liquid triglyceride is added to the product and blended therewith until a clear solution is formed.

The foregoing procedure is applicable particularly to the preparation of vitamin A-containing compositions. Where a product containing both vitamin A and D is to be formulated, it is preferable to add the vitamin D to benzyl alcohol, together with the edible antioxidants. Where a product containing vitamin E in admixture with vitamin A is to be prepared, best results are obtained when the benzyl alcohol solution of the antioxidants, which solution also contains an emulsifying agent and vitamin E, is added to vitamin A alcohol. Where, however, vitamin E is to be used as the sole vitamin component of the product, a somewhat different procedure has been found to be best suited for use. In such a case, vitamin E and the emulsifying agent are mixed until a clear product has been found. Thereafter, the liquid triglyceride and benzyl alcohol are added to the mixture and blended therewith until clear.

The foregoing descriptions of methods by which the present products are prepared are exemplary only. Nothing herein should be construed as limiting the present invention to products prepared by those methods. Certain variations in the described procedures are possible and these variations will be readily apparent to those skilled in the art.

The compositions which are produced as disclosed herein are clear solutions of light to medium viscosity. They are physically stable to both heat and cold. These compositions can be diluted, if desired, with a vegetable oil in any proportion. Moreover, when these compositions are added to water and stirred therein, a milky emulsion results.

The compositions of this invention have been found to be extremely useful in the prevention or alleviation of vitamin deficiencies in cattle and other farm animals. Because of the unique properties thereof, they have been found to be particularly well suited for administration by injection. In the alternative, however, these compositions can be added either to the food or feed, or to the drinking water, of poultry and cattle. Especially in the case of intramuscular injection, these compositions have been shown to exhibit superior biological performance. The biological response to these compositions in the parenteral dosing has been found to be both rapid and prolonged. Furthermore, in those cases where the present compositions have been administered in appropriate dosage levels to goats, calves, turkeys, cattle, etc., by injection, no significant tissue damage has been observed.

For a fuller understanding of the nature and objects of this invention, reference may be had to the following examples which are given merely as further illustrations of the invention and are not to be construed in a limiting sense. All parts given in the examples are parts by weight, unless otherwise indicated.

*Example 1*

In this example, 5.0 grams of butylated hydroxytoluene and 5.0 grams of butylated hydroxyanisole were added to, and stirred in, 20.0 grams of benzyl alcohol. The mixture was heated at a temperature of about 50° C. until the antioxidant mixture had dissolved in the alcohol. Thereafter, the solution which was thus obtained, together with 40.0 grams of polyoxyethylene sorbitan monooleate, was added to 400.0 grams of vitamin A alcohol. The vitamin A alcohol employed contained 3.1 MMU of vitamin A per gram. This mixture was stirred thoroughly. Subsequently, the mixture was added to, and blended with, 530.0 grams of a glyceryl triester of caproic acid.

There was obtained by this procedure a clear, amber-colored solution containing 1,000,000 I.U. of vitamin A per ml. which was easily emulsified in water. The solution was found to be well suited for use as an injectable source of vitamin A.

*Example 2*

In this example, a product was prepared by the method described in Example 1 using, with but one exception, the same ingredients and the same quantities thereof as were employed in preparing the product of Example 1. In this instance, 530.0 grams of a glyceryl triester of a mixture of caproic, caprylic and capric acids were used in lieu of the glyceryl triester of caproic acid employed in the previous example. Caprylic acid comprised about 70% of the weight of the acid mixture, while capric acid and caproic acid comprised about 25% and 5%, respectively, of the mixture.

As was the case in Example 1, this procedure yielded a clear, amber-colored solution containing 1,000,000 I.U. of vitamin A per ml. which was easily emulsified in water. The solution was found to be well suited for use as an injectable source of vitamin A.

*Example 3*

In this example, 3.8 grams of butylated hydroxytoluene and 3.8 grams of butylated hydroxyanisole were added to, and stirred in, 20.0 grams of benzyl alcohol. This mixture was heated at a temperature of about 50° C. until the antioxidant mixture had dissolved in the alcohol. Thereafter, the solution which was thus obtained, together with 40.0 grams of polyoxyethylene sorbitan monooleate, was added to 205.0 grams of vitamin A alcohol (3.1 MMU/g. of vitamin A). This mixture was stirred thoroughly, following which it was added to 727.4 grams of a glyceryl triester of caprylic acid.

A clear, amber-colored and slightly viscous solution containing about 500,000 I.U. of vitamin A per ml. was obtained by this procedure. This solution formed an emulsion when mixed in water. The solution was found to be well suited for use as an injectable source of vitamin to be well suited for use as an injectable source of vitamin A.

*Example 4*

In this example, a product was produced by the method described in Example 3 using, with but one exception, the same ingredients and the same quantities thereof as were employed in preparing the product of Example 3. In producing the present product, there was employed 727.4 grams of a glyceryl triester of a mixture of caproic, caprylic, capric and lauric acids, rather than 727.4 grams of the glyceryl triester of caprylic acid used in the preceding example. The acid mixture was composed of about 65% caprylic acid, about 25% capric acid, about 9% lauric acid and about 1.0% caproic acid.

There was obtained by this procedure a clear, amber-colored solution containing about 500,000 I.U. of vitamin A per ml. This solution formed an emulsion in water. The solution was found to be well suited for use as an injectable source of vitamin A.

*Example 5*

In this example, 1.25 grams of butylated hydroxytoluene and 1.25 grams of butylated hydroxyanisole were added to 80 grams of vitamin A alcohol. The mixture which was thus formed was heated at a temperature of about 60° C. Therefater, 10.0 grams of polyoxyethylene sorbitan monooleate were added to the solution thus obtained and mixed thoroughly therewith. Subsequently, 20.0 grams of benzyl alcohol were added to, and stirred with, this solution. The solution, thus obtained, was then added to, and stirred in, 887.5 grams of a glyceryl triester of capric acid.

A clear, amber-colored solution containing 200,000 I.U. of vitamin A per ml. was obtained by this procedure. The solution itself was slightly viscous in nature. It readily formed, however, an emulsion when mixed with water. The solution was found to be extremely well suited for use as an injectable source of vitamin A.

*Example 6*

In this example, a product was prepared by the procedure described in Example 5 using, with but one exception, the same ingredients and the same quantities thereof as were employed in producing the product of Example 5. In preparing the present product, 887.5 grams of a glyceryl triester of a mixture of caproic, caprylic, capric and lauric acids were employed in lieu of the 887.5 grams of the glyceryl triester of capric acid used in Example 5. The acid mixture was composed of about 65% caprylic acid, 25% capric acid, 9% lauric acid and about 1.0% caproic acid.

The product, thus obtained, was a clear, amber-colored slightly viscous solution, containing 200,000 I.U. per ml. of vitamin A, and it was readily emulsifiable in water. The solution was found to be well suited for use as an injectable preparation.

*Example 7*

In this example, 1.45 grams of vitamin $D_2$ (calciferol) (40.0 MMU/gram), 3.80 grams of butylated hydroxytoluene and 3.80 grams of butylated hydroxyanisole were added to, and dissolved in, 20.0 grams of benzyl alcohol at a temperature of about 50° C. The solution, thus obtained, together with 40.0 grams of polyoxyethylene sorbitan monooleate, was added to 205.0 grams of vitamin A alcohol (3.1 MMU/gram). This mixture was then added to 725.95 grams of a glyceryl triester of caprylic acid. The mixture was blended until a clear product was obtained.

By this method, there was obtained a clear, amber-colored, slightly viscous solution containing 500,000 I.U. of vitamin A per ml. and 50,000 I.U. of vitamin $D_2$ per ml. This solution, when mixed with water, formed an emulsion. The solution was found to be well suited for use as an injectable source of vitamins A and $D_2$.

*Example 8*

In this example, a produce was prepared by the procedure described in Example 7 using, with but two exceptions, the same ingredients and the same quantities thereof, as were employed in producing the product of Example 7. In the present instance, 725.95 grams of a glyceryl triester of a mixture of caproic, caprylic, capric and lauric acids were employed rather than 725.95 grams of the glyceryl triester of caprylic acid used in the immediately preceding example and, as the emulsifier, 40.0 grams of polyethylene 600 monooleate were used rather than the 40.0 grams of polyoxyethylene sorbitan monooleate used in the preceding example. The acid portion of the glyceryl triester was composed of about 65% caprylic acid, about 25% capric acid, about 9.0% lauric acid and about 1.0% caproic acid.

A clear, amber-colored, slightly viscous solution containing about 500,000 I.U. per ml. of vitamin A and about 50,000 I.U. per ml. of vitamin D was obtained. This solution, in water, formed an emulsion. The solution was found to be well suited for use as an injectable source of vitamins A and $D_2$.

*Example 9*

In preparing the product of this example, 3.8 grams of butylated hydroxytoluene and 3.8 grams of butylated hydroxyanisole were added to, and dissolved in, 20.0 grams of benzyl alcohol at a temperature of about 50° C. The solution, which was thus obtained, together with 40.0 grams of polyoxyethylene sorbitan monooleate and 105.0 grams of vitamin E (α-tocopherol) (1100 I.U./gram), was added to 205.0 grams of vitamin A alcohol (3.1 MMU/gram) and mixed thoroughly therewith. Thereafter, 622.4 grams of a glyceryl triester of a mixture of capric, caprylic and caproic acids was added to the mixture, and blended therewith, until a clear product was obtained. The acid portion of the ester comprised about 70% caprylic acid, about 25% capric acid and about 5% of caproic acid.

The product obtained by this procedure was an amber-colored, slightly viscous solution containing 500,000 I.U. per ml. of vitamin A and 100 I.U. per ml. of vitamin E. This solution formed an emulsion in water. The solution was found to be well suited for use as an injectable source of vitamins A and E.

*Example 10*

In producing the product of this example, 1.45 grams of vitamin $D_2$ (calciferol) (40.0 MMU/gram), 3.80 grams of butylated hydroxytoluene and 3.80 grams of butylated hydroxyanisole were added to 20.0 grams of benzyl alcohol and dissolved therein at a temperature of about 50° C. The solution, which was thus obtained, together with 52.50 grams of vitamin E (α-tocopherol) (1100 I.U./gram) and 40.0 grams of polyoxyethylene sorbitan monooleate, was added to 205.0 grams of vitamin A alcohol (3.1 MMU/gram). The mixture was stirred thoroughly. Subsequently, 673.45 grams of a glyceryl triester of a mixture of capric, caprylic, caproic and lauric acids was added to the mixture and blended therewith. The glyceryl triester employed was the same as that used in Example 8.

A clear, slightly viscous, amber-colored solution containing 500,000 I.U. per ml. of vitamin A, 50,000 I.U. per ml. of vitamin $D_2$ and 50 I.U. per ml. of vitamin E was obtained. This solution was readily emulsifiable in water. The solution was found to be extremely well suited for use as an injectable source of vitamins A, $D_2$ and E.

*Example 11*

In this example, 500.0 grams of vitamin E (α-tocopherol) (1100 I.U./gram) was added to 40.0 grams of polyoxyethylene sorbitan monooleate and mixed therewith until clear. Thereafter, 440.0 grams of a glyceryl triester of a mixture of capric, caprylic, caproic and lauric acids and 20.0 grams of benzyl alcohol were added to the clear mixture and blended therewith. The glyceryl triester employed herein was the same as that used in Example 8.

The product, thus obtained, was a clear, slightly viscous, amber-colored solution containing about 500 I.U. per ml. of vitamin E. This solution formed a stable emulsion in water. The product was found to be well suited for use as an injectable source of vitamin E.

*Example 12*

In this example, a product was prepared by the method described in Example 11 using, with but two exceptions, the same ingredients and the same quantities thereof as were employed in Example 11. In the present instance, 440.0 grams of a glyceryl triester of a mixture of capric, caprylic and caproic acids were used in lieu of the 440.0 grams of the glyceryl triester of the mixture of capric, caprylic, caproic and lauric acids employed in the immediately preceding example and 40.0 grams of polyethylene glycol 400 ricinoleate were used in lieu of the 40.0 grams of polyoxyethylene sorbitan monooleate employed in the preceding example. The glyceryl triester used herein was the same as that employed in Example 2.

There was obtained by such procedure, a clear, amber-colored solution containing about 500 I.U. per ml. of vitamin E. This solution, when mixed with water, formed an emulsion. The solution was found to be well suited for use as an injectable source of vitamin E.

We claim:

1. An emulsifiable vitamin solution comprising (1) up to about 70% by weight of a fat-soluble vitamin selected from the group consisting of vitamin A alcohol, vitamin D, vitamin E and mixtures thereof, (2) at least about 0.5% by weight of an emulsifying agent selected from the group consisting of polyethylene glycol esters of fatty acids having from 16 to 18 carbon atoms and polyoxyethylene sorbitan esters of fatty acids having from 16 to 18 carbon atoms, (3) from about 1.0% to about 10.0% by weight of benzyl alcohol, (4) at least about 0.1% by weight of an antioxidant selected from the group consisting of butylated hydroxyanisole, butylated hydroxytoluene and mixtures thereof, the remainder of said solution comprising (5) a glyceride selected from the group consisting of a glyceryl triester of a saturated fatty acid having a carbon chain length of from 6 to 12 carbon atoms, a glyceryl triester of a mixture of saturated fatty acids having carbon chain lengths of from 6 to 12 carbon atoms and mixtures of said glyceryl triesters.

2. An emulsifiable vitamin solution comprising (1) up to about 70% by weight of a fat-soluble vitamin selected from the group consisting of vitamin A alcohol, vitamin D, vitamin E and mixtures thereof, (2) from about 0.5% to about 20.0% by weight of an emulsifier selected from the group consisting of polyethylene glycol esters of fatty acids having from 16 to 18 carbon atoms and polyoxyethylene sorbitan esters of fatty acids having from 16 to 18 carbon atoms, (3) from about 1.0% to about 10.0% by weight of benzyl alcohol, (4) from about 0.1% to about 2.0% by weight of an antioxidant selected from the group consisting of butylated hydroxyanisole, butylated hydroxytoluene and mixtures thereof, the remainder of said solution comprising (5) a glyceride selected from the group consisting of a glyceryl triester of a saturated fatty acid having a carbon chain length of from 6 to 12 carbon atoms, a glyceryl triester of a mixture of saturated fatty acids having carbon chain lengths of from 6 to 12 carbon atoms and mixtures of said glyceryl triesters.

3. An emulsifiable vitamin solution comprising (1) up to about 70% by weight of vitamin E, (2) from about 0.5% to about 20.0% by weight of an emulsifying agent selected from the group consisting of polyethylene glycol esters of fatty acids having from 16 to 18 carbon atoms and polyoxyethylene sorbitan esters of fatty acids having from 16 to 18 carbon atoms and (3) from about 1.0% to about 10.0% by weight of benzyl alcohol, the remainder of said solution comprising (4) a glyceride selected from the group consisting of a glyceryl triester of a saturated fatty acid having a carbon chain length of from 6 to 12 carbon atoms, a glyceryl triester of a mixture of saturated fatty acids having carbon chain lengths of from 6 to 12 carbon atoms and mixtures of said glyceryl triesters.

4. An emulsifiable vitamin solution comprising (1) up to about 70% by weight of a fat-soluble vitamin selected from the group consisting of vitamin A alcohol, vitamin D, vitamin E and mixtures thereof, (2) from about 0.5% to about 20.0% by weight of a polyethylene glycol ester of a fatty acid having a carbon chain length of from 16 to 18 carbon atoms, (3) from about 1.0% to about 10.0% by weight of benzyl alcohol, (4) from about 0.1% to about 2.0% by weight of an antioxidant selected from the group consisting of butylated hydroxyanisole, butylated hydroxytoluene and mixtures thereof, the remainder of said solution comprising (5) a glyceride selected from the group consisting of a glyceryl triester of a saturated fatty acid having a carbon chain length of from 6 to 12 carbon atoms, a glyceryl triester of a mixture of saturated fatty acids having carbon chain lengths of from 6 to 12 carbon atoms and mixtures of said glyceryl triesters.

5. An emulsifiable vitamin solution comprising (1) up to about 70% my weight of a fat-soluble vitamin selected from the group consisting of vitamin A alcohol, vitamin D, vitamin E and mixtures thereof, (2) from about 0.5% to about 20.0% by weight of a polyoxyethylene sorbitan ester of a fatty acid having a carbon chain length of from 16 to 18 carbon atoms, (3) from about 1.0% to about 10.0% by weight of benzyl alcohol, (4) from about 0.1% to about 2.0% by weight of an antioxidant selected from the group consisting of butylated hydroxyanisole, butylated hydroxytoluene and mixtures thereof, the remainder of said solution comprising (5) a glyceride selected from the group consisting of a glyceryl triester of a saturated fatty acid having a carbon chain length of from 6 to 12 carbon atoms, a glyceryl triester of a mixture of saturated fatty acids having carbon chain lengths of from 6 to 12 carbon atoms and mixtures of said glyceryl triesters.

6. An emulsifiable vitamin solution comprising (1) up to about 70% by weight of vitamin A alcohol, (2) from about 0.5% to about 20.0% by weight of polyoxyethylene sorbitan monooleate, (3) from about 1.0% to about 10.0% by weight of benzyl alcohol, (4) from about 0.1% to about 2.0% by weight of a mixture of butylated hydroxyanisole and butylated hydroxytoluene, and (5) at least about 20.0% by weight of a glyceride selected from the group consisting of a glyceryl triester of a saturated fatty acid having a carbon chain length of from 6 to 12 carbon atoms, a glyceryl triester of a mixture of saturated fatty acids having carbon chain lengths of from 6 to 12 carbon atoms and mixtures of said glyceryl triesters.

7. An emulsifiable vitamin solution comprising (1) up to about 70% by weight of a mixture of vitamin A alcohol and vitamin $D_2$, (2) from about 0.5% to about 20.0% by weight of polyoxyethylene sorbitan monooleate, (3) from about 1.0% to about 10.0% by weight of benzyl alcohol, (4) from about 0.1% to about 2.0% by weight of a mixture of butylated hydroxyanisole and butylated hydroxytoluene, and (5) at least about 20.0% by weight of a glyceride selected from the group consisting of a glyceryl triester of a saturated fatty acid having a carbon chain length of from 6 to 12 carbon atoms, a glyceryl triether of a mixture of saturated fatty acids having carbon chain lengths of from 6 to 12 carbon atoms and mixtures of said glyceryl triesters.

8. An emulsifiable vitamin solution comprising (1) up to about 70% by weight of a mixture of vitamin A alcohol and vitamin E, (2) from about 0.5% to about 20.0% by weight of polyoxyethylene sorbitan monooleate, (3) from about 1.0% to about 10.0% by weight of benzyl alcohol, (4) from about 0.1% to about 2.0% by weight of a mixture of butylated hydroxyanisole and butylated hydroxytoluene, and (5) at least about 20.0% by weight of a glyceride selected from the group consisting of a glyceryl triester of a saturated fatty acid having a carbon chain length of from 6 to 12 carbon atoms, a glyceryl triester of a mixture of saturated fatty acids having carbon chain lengths of from 6 to 12 carbon atoms and mixtures of said glyceryl triesters.

9. An emulsifiable vitamin solution comprising (1) up to about 70% by weight of a mixture of vitamin A alcohol, vitamin $D_2$ and vitamin E, (2) from about 0.5% to about 20.0% by weight of polyoxyethylene sorbitan monooleate, (3) from about 1.0% to about 10.0% by weight of benzyl alcohol, (4) from about 0.1% to about 2.0% by weight of a mixture of butylated hydroxyanisole and butylated hydroxytoluene, and (5) at least about 20.0% by weight of a glyceride selected from the groups consisting of a glyceryl triester of a saturated fatty acid having a carbon chain length of from 6 to 12 carbon atoms, a glyceryl triester of a mixture of saturated fatty acids having carbon chain lengths of from 6 to 12 carbon atoms and mixtures of said glyceryl triesters.

10. An emulsifiable vitamin solution comprising (1) up to about 70% by weight of vitamin E, (2) from about 0.5% to about 20.0% by weight of polyoxyethylene sorbitan monooleate, (3) from about 1.0% to about 10.0% by weight of benzyl alcohol, and (4) at least about 20.0% by weight of a glyceride selected from the group consisting of a glyceryl triester of a saturated fatty acid having a carbon chain length of from 6 to 12 carbon atoms, a glyceryl triester of a mixture of saturated fatty acids having carbon chain lengths of from 6 to 12 carbon atoms and mixtures of said glyceryl triesters.

11. An emulsifiable vitamin solution comprising (1) up to about 70% by weight of vitamin D, (2) from about 0.5% to about 20.0% by weight of polyethylene glycol 600 monooleate, (3) from about 1.0% to about 10.0% by weight of benzyl alcohol, (4) from about 0.1% to about 2.0% by weight of a mixture of butylated hydroxyanisole and butylated hydroxytoluene, and (5) at least about 20.0% by weight of a glyceride selected from the group consisting of a glyceryl triester of a saturated fatty acid having a carbon chain length of from 6 to 12 carbon atoms, a glyceryl triester of a mixture of saturated fatty acids having carbon chain lengths of from 6 to 12 carbon atoms and mixtures of said glyceryl triesters.

12. An emulsifiable vitamin solution comprising (1) up to about 70% by weight of vitamin E, (2) from about 0.5% to about 2.0% by weight of polyethylene glycol 400 ricinoleate, (3) from about 1.0% to about 10.0% by weight of benzyl alcohol, and (4) at least about 20.0% by weight of a glyceride selected from the group consisting of a glyceryl triester of a saturated fatty acid having a carbon chain length of from 6 to 12 carbon atoms, a glyceryl triester of a mixture of saturated fatty acids having carbon chain lengths of from 6 to 12 carbon atoms and mixtures of said glyceryl triesters.

References Cited in the file of this patent

UNITED STATES PATENTS

| | | |
|---|---|---|
| 2,777,798 | Hochberg | Jan. 15, 1957 |
| 2,988,484 | Barsky | June 13, 1961 |
| 3,036,957 | Lehman | May 29, 1962 |
| 3,070,499 | Mullins | Dec. 25, 1962 |

FOREIGN PATENTS

| | | |
|---|---|---|
| 692,334 | Great Britain | June 3, 1953 |
| 710,817 | Great Britain | June 16, 1954 |

UNITED STATES PATENT OFFICE
CERTIFICATE OF CORRECTION

Patent No. 3,149,037                      September 15, 1964

Ronald Eugene Aiello et al.

It is hereby certified that error appears in the above numbered patent requiring correction and that the said Letters Patent should read as corrected below.

Column 1, line 38, for "glycerines" read -- glycerides --; column 5, line 48, strike out "to be well suited for use as an injectable source of vitamin"; column 6, line 51, for "produce" read -- product --; column 9, line 1, for "my" read -- by --; line 42, for "triether" read -- triester --.

Signed and sealed this 13th day of April 1965.

(SEAL)
Attest:

ERNEST W. SWIDER                            EDWARD J. BRENNER
Attesting Officer                               Commissioner of Patents